United States Patent [19]

Kaiser, Jr. et al.

[11] Patent Number: 5,016,730

[45] Date of Patent: May 21, 1991

[54] ACOUSTIC FILTER HAVING ACOUSTIC ISOLATION OF INTERNAL FLOW ELEMENT

[75] Inventors: John E. Kaiser, Jr.; James J. Lockshaw, both of Huntington Beach; Juan J. Ruiz, Yorba Linda; William L. Stevens, Santa Ana, all of Calif.

[73] Assignee: Tolo, Inc., Santa Ana, Calif.

[21] Appl. No.: 466,037

[22] Filed: Jan. 17, 1990

[51] Int. Cl.$^5$ .............................................. F01N 1/08
[52] U.S. Cl. ..................................... 181/265; 181/272
[58] Field of Search ............... 181/226, 233, 234, 241, 181/243, 249, 250, 265, 272; 55/276

[56] References Cited

U.S. PATENT DOCUMENTS

| | | | |
|---|---|---|---|
| 2,259,516 | 10/1941 | Deremer | 181/241 |
| 2,993,559 | 7/1961 | Everett | 55/276 X |
| 3,200,902 | 8/1965 | Jones | 181/243 |
| 4,055,231 | 10/1977 | Martinez | 181/241 |
| 4,220,219 | 9/1980 | Flugger | 181/265 |
| 4,278,147 | 7/1981 | Watanabe et al. | 181/272 X |

Primary Examiner—Brian W. Brown
Attorney, Agent, or Firm—Louis J. Bachand

[57] ABSTRACT

An acoustic filter in which the internal flow element is acoustically decoupled from the surrounding vessel to lower noise emanating from the filter by securing the filter bulkheads to the internal flow element rather than welding to the vessel wall. The connection of the bulkhead to the vessel is mechanically discontinuous and reduced vibration transmission to the vessel from the internal flow element is obtained. The internal flow element is a unitary body with channels which are readily formed. The filter vessel is better able to move relative to the bulkheads in response to pressure and temperature changes with the invention design.

18 Claims, 2 Drawing Sheets

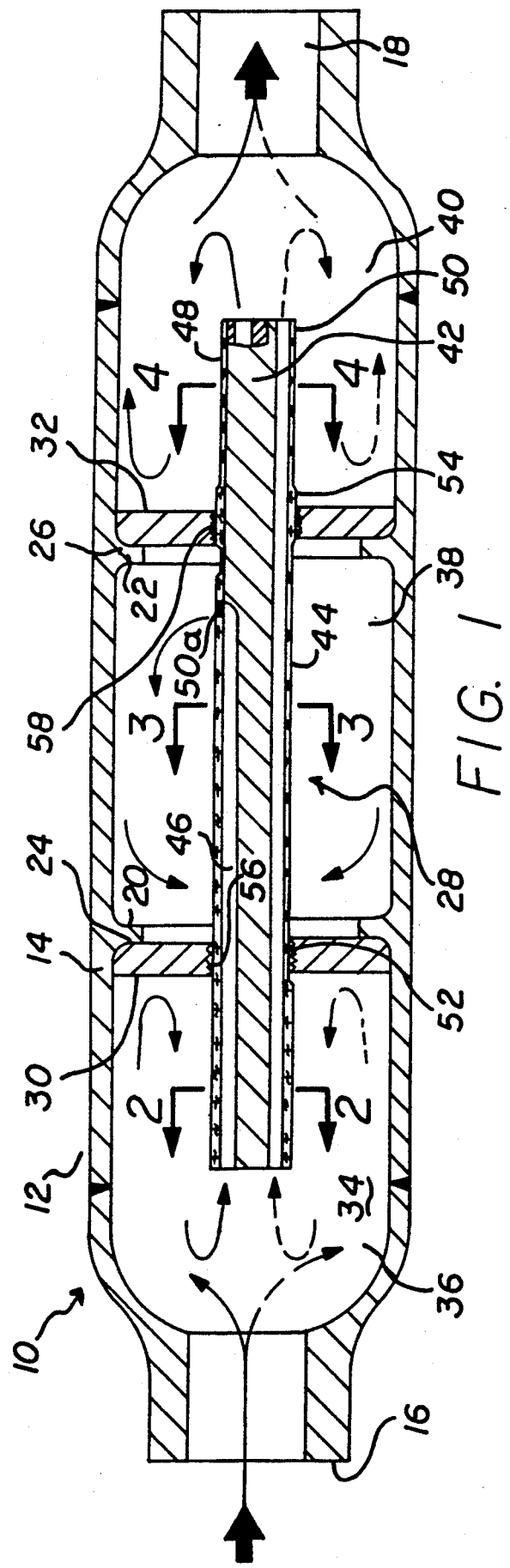

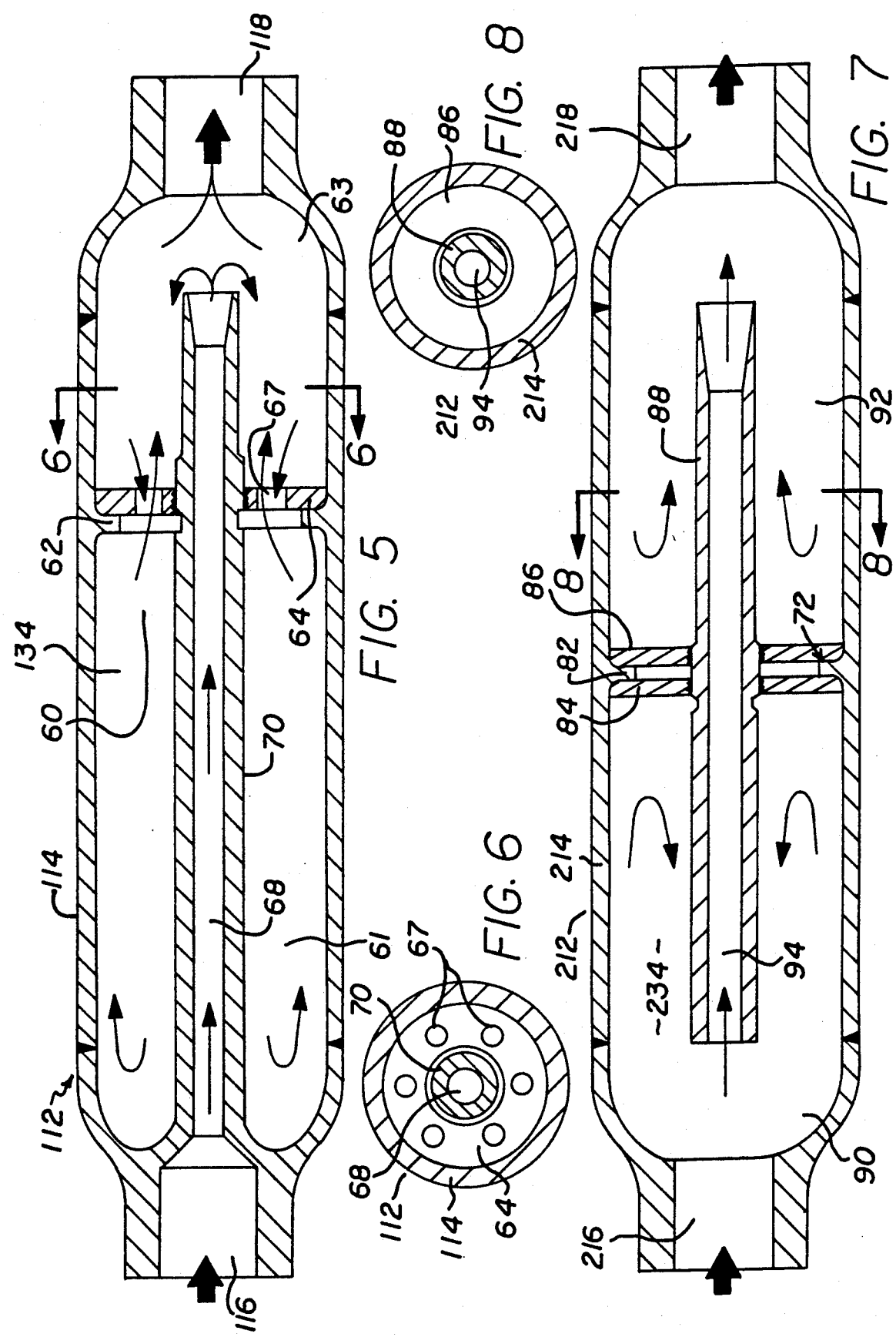

ACOUSTIC FILTER HAVING ACOUSTIC ISOLATION OF INTERNAL FLOW ELEMENT

FIELD OF THE INVENTION

This invention has to do with acoustic filters, and more particularly with an improved acoustic filter structure having a novel mounting of chamber bulkheads which at once is less costly to manufacture and build and acoustically isolates the internal flow element from the vessel containing the element to reduce noise transmission into the filter environment.

BACKGROUND

Acoustic filters are used to dampen pulsation vibration in fluid flow systems, such as those using pumps to move fluid through piping. It has been the practice, see U.S. Pat. No. 2,993,559 to Everett, to provide an internal flow element within a vessel arranged to divide and recombine flowing fluids to offset and cancel pulsations. This has been accomplished by defining separate flow paths through element of differing lengths. The element are supported in the acoustic filter vessel by transverse bulkheads welded to or integral with the vessel wall.

SUMMARY OF THE INVENTION

It has been found that the welding or integration of the bulkheads to the vessel wall transmits vibratory sound from the internal flow element through the vessel wall creating an unnecessarily noisy environment. Further the bulkhead fixed connection restrains expansion or contraction of the vessel under changing temperature and pressure conditions and creates stresses in the apparatus. Moreover, the cost of manufacture of the prior art design is high owing to difficult welding situations or high machining costs.

It is accordingly an object of the present invention to provide an improved acoustic filter. It is an object to isolate or acoustically decouple the internal flow element from the vessel to reduce noise. It is another object to provide a low manufacturing cost acoustic filter which is not subject to stresses between bulkhead and vessel wall in changing environmental conditions or varying pressures. It is another object to provide a new design of bulkhead and a new design of internal flow element which can be manufactured and assembled into an acoustic filter at much reduced cost. It is a specific object to provide an acoustic filter in which the internal flow element is mounted centrally of the filter vessel, and has the chamber defining bulkheads mounted to it rather than to the vessel wall to isolate vibrations of the internal flow element from the wall. Another specific object is the elimination of multiple piping arrays in acoustic filters by the provision of a unitary internal flow element body in which different length, different location channels are provided in the one body to conduct fluid between different pairs of chambers in pulsation dampening relation.

These and other objects of the invention to become apparent hereinafter are realized in a low noise, acoustic filter for fluid flow systems comprising a vessel having a wall defining an enclosed volume and having an inlet and an outlet, a bulkhead cooperating with the wall to define a chamber within the vessel enclosed volume, and an internal flow element communicating the inlet and outlet through the bulkhead in a manner providing forward and reverse fluid flow within the chamber, the bulkhead being supported within the vessel by the element freely of fixed connection to the wall such that the wall is capable of expansion or contraction movement unrestrained by the bulkhead, whereby the element is acoustically decoupled from the vessel for lowered noise around the acoustic filter.

In particular embodiments: the bulkhead defines a succession of chambers within the vessel enclosed volume; there is further included a plurality of the bulkheads axially spaced within the vessel and defining multiple successive chambers therein; the vessel wall defines a step, the bulkhead being engaged with the step in chamber defining relation; the internal flow element and bulkhead are cooperatively threaded for thread adjusting engagement of the bulkhead with the vessel wall; and, the vessel is generally cylindrical, the bulkhead is generally circular, and there is further included a generally annular step extending inwardly within the vessel, the bulkhead perimetrically engaging the step.

In another aspect of the invention there is provided an acoustic filter internal flow element for communicating between multiple chambers in acoustic filtering relation, the element comprising an elongated body having a series of circumferentially spaced and peripherally disposed channels formed therein, and sleeve means fluid-tightly covering the channels, the channels varying in length and location on the body, whereby different pairs of chambers are communicated by different channels, and means to mount element within a multiple chamber acoustic filter.

In this and like embodiments: the element sleeve defines external threads for thread connected support within the acoustic filter chambers; and, the element is combined with an acoustic filter chamber-defining bulkhead, the bulkhead being supported within the filter chambers by connection with the flow element.

In a particularly preferred embodiment there is provided an acoustic filter for fluid flow systems, the filter comprising an axially extended vessel having a wall defining an enclosed volume and having a generally opposed inlet and outlet, a transverse bulkhead cooperating with the wall to define a chamber within the vessel enclosed volume, and an axially extended internal flow element extending longitudinally within the vessel, the element communicating the inlet and outlet through the bulkhead in a manner providing forward and reverse fluid flow within the chamber, the bulkhead being supported within the vessel by the element freely of fixed connection to the wall, whereby the element is acoustically decoupled from the vessel for reduced noise beyond the vessel.

In this and like embodiments, there is also included a second transverse bulkhead whereby the vessel is divided into longitudinally axially spaced first, second and third chambers, the first chamber being adjacent the inlet, the third chamber being adjacent the outlet, and the second chamber being between the first and third chambers, and in which the internal flow element comprises an elongated unitary body generally disposed along the axis of the vessel and having three separate elongated parallel passages defined therein arranged about the body axis respectively to communicate different pairs of the chambers, whereby a portion of fluid entering the filter vessel is passed from the first chamber via a first channel to a third chamber, a further portion of fluid is passed from the first chamber via a second channel to a second chamber, and the balance of the entering fluid reverses direction within the first chamber until passing through the first or second channel, and whereby the flow into the second chamber is reversed in flow direction within the second chamber and finally passed via a third channel into the third chamber wherein the second chamber fluid is combined with the third chamber fluid direct from the first chamber and all the entering fluid exits through the outlet.

Typically: the body passages are defined by circumferentially spaced and peripherally disposed, outwardly-opening channels formed in the body and a fluid tight sleeve enclosing the channels; the vessel wall defines axially spaced steps, the bulkheads being engaged with the steps in chamber defining relation; the sleeve and bulkheads are cooperatively threaded for thread adjusting engagement of the bulkheads with the vessel wall; the vessel is generally cylindrical, each bulkhead is generally circular, and each step is a generally annular step and extending inwardly within the vessel, the bulkheads perimetrically engaging an opposing step; and the bulkhead is formed of metal or composite fiber and organic matrix material.

In a further particular embodiment the internal flow element communicates directly between the inlet and the chamber and extends in cantilevered relation into the chamber, the bulkhead being ported to pass fluid reversely, whereby pulsations in the fluid are acoustically damped.

In yet another embodiment there is provided an acoustic filter in which said internal flow element is supported by the bulkhead paraxially of the vessel and in spaced relation to the inlet and the outlet, the bulkhead dividing the vessel interior into at least first and second chambers which are communicated with the inlet and outlet respectively, the bulkhead blocking fluid flow between the chambers except through the internal flow element.

BRIEF DESCRIPTION OF THE DRAWINGS

The invention will be further described as to an illustrative embodiment in conjunction with the attached drawings in which:

FIG. 1 is a view in longitudinal section of the apparatus according to the invention;

FIG. 2 is a view taken on lines 2—2 in FIG. 1;

FIG. 3 is a view like FIG. 2 taken on line 3—3 in FIG. 1;

FIG. 4 is a view like FIG. 2 taken on line 4—4 in FIG. 1;

FIG. 5 is a view like FIG. 1 of a modified form of the apparatus;

FIG. 6 is a view taken on line 6—6 in FIG. 5;

FIG. 7 is a view like FIG. 1 of a second modified form of the apparatus; and,

FIG. 8 is a view taken on line 8—8 in FIG. 7.

PREFERRED MODES

Before turning to the drawings in detail it will be noted that the use of welding and like fixing of the bulkheads to the vessel, as by machining, has been eliminated in the new design. The fact that the bulkheads merely butt against interior steps in the pressure containing vessel and are not welded thereto provides a mechanical discontinuity and an acoustic decoupling which reduces the frequency and pressure of vibrations outside the vessel to effect a reduction in noise. The vibration of the internal flow element is effectively isolated from the vessel wall by the new bulkhead arrangement.

In another aspect, the internal flow element is used in acoustic filters to define an extended flow path relative to the length of the containing vessel. This has in the past been achieved by arrays of different length, different location piping sections arranged to pass fluid to or through chambers. Mounting of this piping array in a chamber has been cumbersome and costly. Coupled with the previously mentioned welding of the bulkheads, assembly or manufacture of acoustic filters has been difficult and expensive and of course liable to failure at the many points being welded. The unitary body disclosed herein has circumferentially disposed, axially extended, outwardly open channels, covered by a sleeve, to define different destination flow paths. The machining of the channels into the body is comparatively simple and assembly of a sleeve thereon easy. The sleeve is externally threaded to thread connect with the bulkheads which latter are thereby supported within the vessel.

As will be apparent as the description proceeds, the invention design results in a smaller, more compact acoustic filter. Internal volumes formerly taken up in conventional designs by the metal piping of the internal flow elements, bracing and straight flanges on the bulkheads are made available for fluid volume required for the compressibility element of the filter. Further, the wall thickness of the external pressure containing shell for a given operating pressure can be reduced since welding-related concerns such as undercutting, overheating, fatigue, and the like are eliminated along with the welding operation.

With reference to FIGS. 1-4, the acoustic filter is shown at 10 and comprises a vessel 12 having a generally cylindrical wall 14 with a fluid inlet 16 and opposite thereto a fluid outlet 18. First and second annular steps 20, 22 respectively are formed within the vessel 12 by annular flanges 24, 26.

An internal flow element 28, to be later described, extends coaxially within the vessel 12. First bulkhead 30 abuts step 20 held there in a manner to be described. A second bulkhead 32 abuts step 22 held in the manner of the first bulkhead 30. Bulkheads 30, 32 divide the vessel 12 interior 34 into three axially aligned chambers 36, 38 and 40, with chamber 36 being adjacent and open to the fluid inlet 16, chamber 40 being adjacent and open to the fluid exit 18, and chamber 38 being between chambers 36 and 40.

The internal flow element 28 comprises a unitary body 42 of metal or other suitable material. Body 42 is machined or molded to have a set of three channels 44, 46 and 48 formed therein. Channels 44, 46 and 48 are arcuate cross-section grooves spaced uniformly about the circumference of the element body 42. A sleeve 50 fluid-tightly circumscribes the body 42 forming an outer wall for each of the channels 44, 46 and 48. It will be observed from a comparison of FIGS. 2, 3 and 4 that channel 44 extends the entire length of the body 42, such that the channel communicates chamber 36 with chamber 40, the sleeve 50 covering the channel for the length of intermediate chamber 38 so that chamber 38 is not in communication with channel 44. Channel 46 extends only between the first and intermediate chambers 36, 38 respectively. Sleeve 50 is apertured at 50a to permit flow from channel 46 into chamber 38. Channel 48 extends only between the intermediate and last chambers 38, 40, respectively. It will be readily perceived that with the stated arrangement of channels, fluid flowing into the first chamber is divided between channel 44 and channel 46 with the former channel delivering fluid only to the last chamber 40 while the latter channel delivers fluid only to intermediate chamber 38. Channel 48 delivers fluid only from intermediate chamber 38 to the last chamber 40. In this manner the pulsation in the fluid flow is offset and cancelled as with previous acoustic filter devices which use a varying length flow path to achieve this objective. In this case, however, the different flow paths are defined by simply cut grooves in a unitary body, rather than being formed from piping spaced and braced within the vessel.

A signal feature of the invention is the bulkhead arrangement which will now be described. As noted above, sleeve 50 circumscribes the body 42 to form the internal flow element 28. With reference to FIG. 1 particularly, sleeve 50 is noted to define outward threads 52, 54 opposite bulkheads 30, 32 respectively. Threads 52 may be dispensed with and a slip fit with mechanical clearance provided. Sleeve threads 52, 54 thread connect with inward threads 56, 58, respectively, on bulkheads 30, 32, so that the bulkheads may be supportively connected to the internal flow element 28 by simply threading onto sleeve 50 as shown. The position of the threads 52, 54 are such that the bulkheads 30, 32 may be drawn tightly against the steps 20, 22.

The engagement between the bulkheads 30, 32 which may be metal or a suitable composite of an organic plastic and fibers or other reinforcement, and steps 20, 22 is tight but not fixed as is the case with welding or machining fabrication of the acoustic filter, with the result that vibration transmission is mechanically discontinuous from the element 28 to the vessel wall 14. In this manner, the element 28 is acoustically isolated from the vessel 12 with the result of a marked reduction in noise outside the vessel.

The invention is equally adaptable to gas or liquid fluid systems and to pi-filter or impedance tube configurations.

Turning to FIGS. 5 and 6, an impedance tube filter configuration is shown including a containment vessel 112 with a cylindrical wall 114, inlet 116 and outlet 118. A single step 60 is defined within the vessel interior 134 by internal flange 62 dividing the vessel interior into chambers 61 and 63. Bulkhead 64 formed of metal or composite material is butted against the step 60 by threading onto flow control element 70 at threads 66. Flow control element 70 extends axially through the vessel 112, supported at the inlet 116 and cantilevered into chamber 63 beyond the bulkhead 64. Bulkhead 64 is circularly ported at 67 such that fluid entering chamber 63 through passage 68 in flow control element 70 direct from the inlet 116 as shown either exits or as back pressure dictates at the outlet 118, reverses flow direction and passes into chamber 61 to be again reversed in flow direction and passed back through ports 67 and thence to the outlet 118 for pulsation damping. The bulkhead arrangement in this embodiment provides the same benefits of reduced noise output as explained in connection with the previous embodiment.

With reference to FIGS. 7 and 8, a pi filter configuration is shown to include a containment vessel 212 with a cylindrical wall 214, inlet 216 and outlet 218. A single step 72 is defined within the vessel interior 234 by internal flange 82. A pair of opposed bulkheads 84, 86 abut the step 72 threaded onto internal flow control element 88 which extends axially within the vessel 212 supported by the bulkheads. The bulkheads 84, 86 define axially disposed chambers 90, 92. Flow through the vessel 212 is into the chamber 90 partly directly into the passage 94 in element 88 and partly into the chamber about the element. Flow from the passage 94 is into the chamber 92 and from the chamber out the outlet 218 for pulsation damping. The bulkhead arrangement of this embodiment provides the same benefits of reduced noise output as explained in connection with the previous embodiment.

It will be apparent from the foregoing that the present invention affords the advantages over existing acoustic filters of using fewer internal parts, eliminating certain welding or brazing operations, avoidance of internal elastomers and seals, avoidance of internal service parts, avoidance of moving parts, possible use of dissimilar metals for internal and external members for the benefits of each, tolerance for a wide variety of fluids and corrosive conditions, wide range of operating temperature conditions, compact configuration and lightweight, and enhanced performance through bulkhead acoustic isolation.

We claim:

1. Low noise, acoustic filter for fluid flow systems, said filter comprising a vessel having a wall defining an enclosed volume and having an inlet and an outlet, a bulkhead cooperating with said wall to define at least one chamber within said vessel enclosed volume, said wall having an inwardly extending means for engaging said bulkhead, and an internal flow element communicating said inlet and outlet through said bulkhead, said flow element comprising means for reverse fluid flow within said chamber, said bulkhead being supported within said vessel by said element freely of fixed connection to said wall such that said wall is capable of expansion or contraction movement unrestrained by said bulkhead, whereby said element is acoustically decoupled from said vessel for lowered noise around said acoustic filter.

2. Acoustic filter according to claim 1, in which said bulkhead defines a succession of chambers within said vessel enclosed volume.

3. Acoustic filter according to claim 1, including also a plurality of said bulkheads axially spaced within said vessel and defining multiple successive chambers therein.

4. Acoustic filter according to claim 1, in which said vessel wall includes a step, said bulkhead being engaged with said step in chamber defining relation.

5. Acoustic filter according to claim 4, in which said element and bulkhead are cooperatively threaded for thread adjustable engagement of said bulkhead with said vessel wall step.

6. Acoustic filter according to claim 1, which said vessel is generally cylindrical, said bulkhead is generally circular, and including also a generally annular step supported by said vessel wall and extending inwardly within said vessel, said bulkhead perimetrically engaging said step.

7. Acoustic filter internal flow element for communicating between multiple chambers arranged with said element in acoustic filtering relation within a vessel, said element comprising an elongated body having a series of circumferentially spaced and peripherally disposed channels formed therein, and sleeve means fluid-tightly covering said channels, said channels varying in length and location on said body, whereby different pairs of chambers are communicated by different channels, and means to mount said element within a multiple chamber acoustic filter within said vessel.

8. Acoustic filter flow element according to claim 7, in which said element sleeve defines external threads for thread connected support within said acoustic filter chambers.

9. Acoustic filter flow element according to claim 7, in which said chambers are defined by bulkhead within said vessel, said element being in combination with an acoustic filter chamber-defining bulkhead, said bulkhead being supported within said vessel by connection with said internal flow element.

10. Acoustic filter for fluid flow systems, said filter comprising an axially extended vessel having a wall defining an enclosed volume and having a generally opposed inlet and outlet, a transverse bulkhead cooperating with said wall to define at least one chamber within said vessel enclosed volume, and axially extended internal flow element extending longitudinally within said vessel, said element communicating said inlet and outlet through said bulkhead and comprising means for providing forward and reverse fluid flow within said chamber, said bulkhead being supported within said vessel by said element freely of fixed connection to said wall, whereby said element is acoustically decoupled from said vessel for reduced noise beyond said vessel.

11. Acoustic filter according to claim 10, including also a second transverse bulkhead whereby said vessel is divided into axially spaced first, second and third chambers, said first chamber being adjacent said inlet, said third chamber being adjacent said outlet, and said second chamber being between said first and third chambers, and in which said internal flow element means comprise an elongated unitary body having three separate elongated passages defined therein arranged respectively to communicate different pairs of said chambers, whereby a portion of fluid entering said filter vessel is passed from the first chamber via a first channel to a third chamber, a further portion of fluid is passed from said first chamber via a second channel to a second chamber, and the balance of said entering fluid reverses direction within said first chamber until passing through said first or second channel, and whereby said flow into said second chamber is reversed in flow direction within said second chamber and finally passed via a third channel into said third chamber wherein said second chamber fluid is combined with said third chamber fluid direct form said first chamber and all the entering fluid exits through said outlet.

12. Acoustic filter according to claim 11, in which said body passages are defined by circumferentially spaced and peripherally disposed channels formed in said body and a fluid tight sleeve enclosing said channels.

13. Acoustic filter according to claim 12, in which said vessel wall includes axially spaced steps, said bulkheads being engaged with said steps in chamber defining relation.

14. Acoustic filter according to claim 13, in which said sleeve and bulkheads are cooperatively threaded for thread adjusting engagement of said bulkheads with said vessel wall.

15. Acoustic filter according to claim 14, in which said vessel is generally cylindrical, each said bulkhead is generally circular, and each said step is generally annular step supported by said vessel wall and extending inwardly within said vessel, said bulkheads perimetrically engaging an opposing step.

16. Acoustic filter according to claim 15, in which said bulkhead is formed of metal or composite fiber and organic matrix material.

17. Acoustic filter according to claim 1, in which said internal flow element communicates directly between said inlet and said chamber and extends in cantileverd relation into said chamber, said bulkhead being ported to pass fluid reversely, whereby pulsations in said fluid are acoustically damped.

18. Acoustic filter according to claim 1, in which said internal flow element is supported by said bulkhead paraxially of said vessel and in spaced relation to said inlet and said outlet, said bulkhead dividing said vessel interior into at least first and second chambers which are communicated with said inlet and said outlet respectively, said bulkhead blocking fluid flow between said chambers except through said internal flow element.

* * * * *